Patented June 17, 1924.

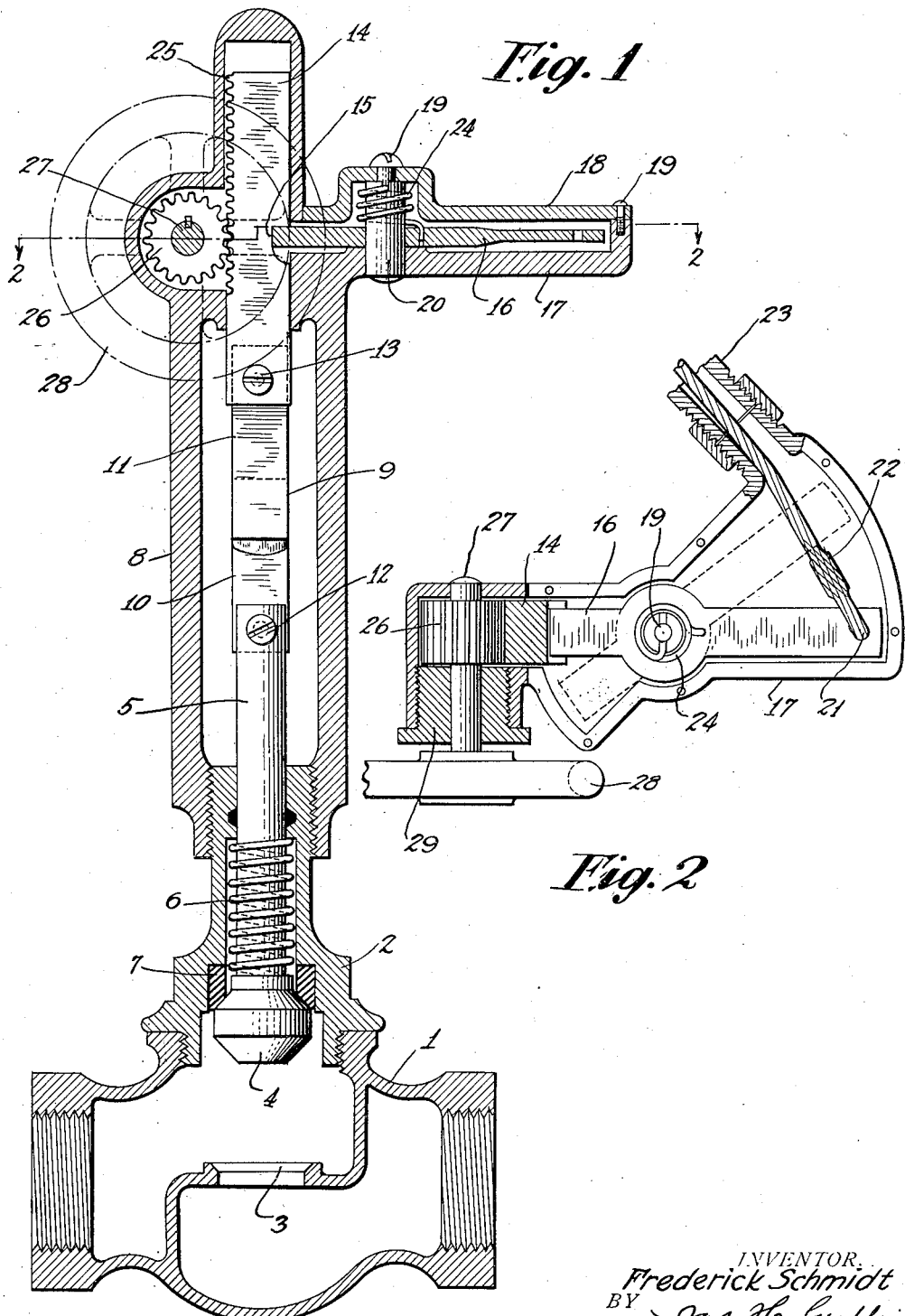

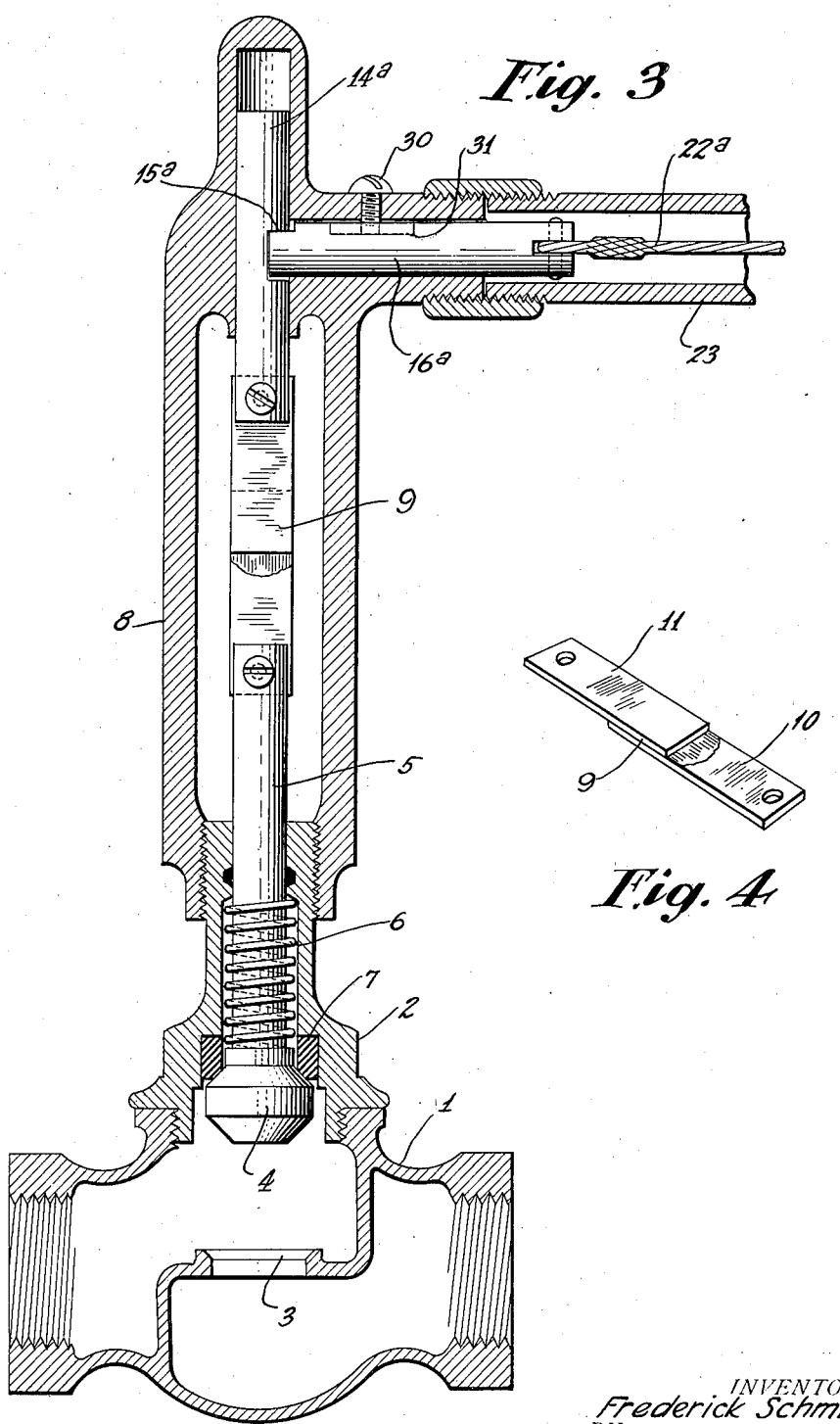

1,497,946

UNITED STATES PATENT OFFICE.

FREDERICK SCHMIDT, OF BROOKLYN, NEW YORK.

AUTOMATIC SHUT-OFF VALVE.

Application filed March 26, 1923. Serial No. 627,577.

*To all whom it may concern:*

Be it known that I, FREDERICK SCHMIDT, a citizen of the United States, residing at New York city, borough of Brooklyn, county of Kings and State of New York, have invented a certain new and useful Automatic Shut-Off Valve, of which the following is a specification.

This invention relates to automatic shut off valves and while adapted for general application is particularly intended for use in connection with the pipes leading from gas mains to the meters of houses or buildings.

In Patent No. 944,638, issued to me on December 28, 1909, I described and claimed a valve intended for this purpose and the present invention is an improvement upon the construction of this patent. In the patent referred to, the sealing member of the valve is adapted to be normally maintained free from its seat to permit of flow of gas to the meter by means of a fusible member or link associated with the valve stem which fusible link is so constituted that it will be automatically disrupted in the event of a predetermined rise in temperature to permit a spring to automatically force the sealing member to its seat and shut off the supply of gas. In the patented valve, the fusible link is restrained by a yoke associated with the valve casing and one part or section of the link is directly secured to the yoke. The parts are so constructed that after initially set, the valve can only be closed by disruption of the fusible link and the parts can only be reset by dismantling a portion of the valve in order to return the valve stem to its normally retracted position to permit of the association of a new link therewith. Such valve is therefore purely automatic in character and was not intended to be manually released. Moreover, the resetting of the valve required considerable time and labor.

The present invention constitutes a marked improvement over the prior one in that it provides a construction which will not only permit of the automatic sealing of the valve, but is also capable of manual release from a distant point, so that in the event of fire even though the temperature in the immediate vicinity of the valve is insufficient to effect its automatic operation, the firemen may, from the exterior of the building, or from some other suitable point effect a manual closing of the valve to shut off the supply of gas to a house or building.

Another feature of advantage in the present construction is that in its preferred form it embodies means whereby the parts may be readily reset in a simple and expeditious manner and without necessitating dismantling of the valve parts.

Features of the invention, other than those specified, will be apparent from the hereinafter detailed description and claims, when read in conjunction with the accompanying drawings.

The accompanying drawings illustrate different practical embodiments of the invention, but the constructions shown therein, are to be understood as illustrative, only, and not as defining the limits of the invention.

Figure 1 is a central section of valve mechanism embodying the present invention.

Figure 2 is a section on the line 2—2 of Figure 1.

Figure 3 is a view similar to Figure 1, but showing a modified form of construction; and, Figure 4 is a perspective view of the fusible link shown in Figures 1 and 3.

In the accompanying drawings, I have shown a valve casing with its associated valve, a valve stem and an impelling spring of the same general type as shown in my said patent. 1 designates the valve casing, the cap portion 2 of which is threaded into the body of the casing. 3 is a valve seat, 4 the sealing member and 5 the valve stem. The spring for normally impelling the sealing member to the seat is designated 6 and 7 is the resilient gasket with which the sealing member is adapted to engage when in retracted position for the purpose of precluding leakage past the valve stem.

The upper portion of the cap 2 is threaded as in the prior construction and a yoke 8 is screwed upon the threaded portion of the cap. The fusible link is designated 9 and embodies two separable sections 10 and 11 normally maintained in united condition by means of fusible solder or other suitable fusible substance. The lower section 10 projects into a slot in the upper end of the valve stem and is secured thereto by means of a screw 12. The upper section is also perforated for the passage of a screw 13 cooperating with a structural element hereinafter described. It is in the yoke portion of the construction that the present invention differs from the prior one and the novel features of construction will now be described.

In accordance with this invention, instead of securing the upper section 11 of the fusible link directly to the yoke as in the prior case, said section is adapted to project into a slot in the lower end of a keeper 14 and the screw 13 is threaded through this keeper and across the slot and secures the section 11 thereto. The upper portion of the yoke, which, in practice, is cast, is chambered to form a guide way in which the keeper is mounted for longitudinal sliding movement and means is provided for normally locking the keeper in this raised position so that it is adapted through the fusible link and valve stem 5 to maintain the sealing member 4 of the valve in retracted position. This means however is so constituted as to enable it to be manually tripped in order to release the keeper and thereby permit the sealing member to seat under the action of the spring 6. The keeper 14 as well as the retaining means referred to may differ in construction and two illustrative forms are shown, respectively in Figures 1 and 3.

In Figure 1, the keeper is shown as in the form of a square rod or plunger, one face of which is provided with a notch 15 with which is adapted to cooperate a latch 16. The latch is positioned within a housing 17 preferably cast integral with the yoke 8 and extending laterally from one side thereof. The housing 17 has a removable cover 18 held in place by screws 19 and extending vertically into the housing is a post 20 forming a fulcrum or pivot for the latch 16. The latch is pivoted intermediate its ends on the post 20 and the short arm of said latch extends in the direction of the keeper 14, while the longer arm of said latch extends in a direction away from said keeper and is perforated at 21, so that a cable or other flexible connection 22 may be secured thereto. The flexible connection is adapted to extend through a suitable conduit 23 associated therewith to any suitable location, but, in practice, the conduit 23 usually leads to a cast iron box on the exterior of the building and the end of the cable 22 is provided with a handle or knob. The box referred to may have a locked door so that any authorized person can open the door to actuate the cable if desired. Firemen however if not in possession of the key may simply smash the box in order to gain access to and operate the cable.

A spring 24 is coiled around the post 20, one end being secured to the post and the other end being secured to the latch and serving to normally oscillate the latch into a position wherein it will engage with the notch 15. Under normal conditions, the structure is as shown in Figure 1 with the latch in engagement with the notch 15 to retain the keeper in elevated position and hold the valve sealing member free from its seat. However, in the event of fire, the fire will if in the direct vicinity of the valve cause disruption of the fusible link 9 and the automatic sealing of the valve. However, if prior to its automatic operation, firemen desire to shut off the gas from house or building they may open or smash the box referred to and by pulling on the cable 22 swing the latch 16 into the dotted line position of Figure 2. In so doing, the latch will release the keeper 14 and the spring 6 will thereupon immediately force the sealing member to the seat and shut off the gas.

The parts may be reset after the fire has been put out and danger is past in any suitable manner, but, in Figure 1, I have illustrated a convenient and highly efficient means for this purpose. In this showing, the keeper 14 is toothed along one of its faces to provide a rack 25 and with this rack cooperates a pinion 26. The pinion 26 is fixed to a shaft 27 journaled in the walls of the yoke which is cored out to receive and house the gear 26. A hand wheel 28 is secured to the shaft 27 and in order to reset the parts, the following operations are carried out.

The keeper 14 is first lowered, if it is not already lowered, to a sufficient degree to permit a new link 9 to be substituted for the one which has been disrupted. If the old link has not been disrupted, this operation is unnecessary as the parts may be immediately set into normal position. The hand wheel 28 is now turned in a counter-clockwise direction as viewed in Figure 1 to elevate the keeper and as the keeper is elevated the notch 15 will be brought into alinement with the nose of the latch 16, whereupon the spring 24 will automatically throw the latch into a position to engage the notch, whereupon the hand wheel may be released and the parts will be in their normal reset position and ready for a subsequent sealing of the valve either automatically through the disruption of the link 9 or manually through operation of the cable 22.

The shaft is preferably carried by a threaded plug 29, which screws into the casing and is of sufficient diameter to permit the withdrawal of the gear with the shaft and plug when said plug is screwed out. This construction facilitates the assembly and dismantling of the parts.

The construction shown in Figure 1 is highly efficient, practical and convenient and is thoroughly trustworthy and reliable either from the standpoints of manual or automatic operation.

In practice, I preferably surround the open portion of the yoke with a tubular wire screen so as to preclude extraneous objects from engaging the fusible link or persons from tampering with the screws 12 and 13. However, this may be dispensed with if desired and is not shown in the drawings for this reason.

In Figure 3, I have shown a modified form of construction embodying a simplified form of retainer consisting in a plunger 16ª which is adapted to operate after the manner of a bolt in the notch 15ª of the keeper 14ª. To the outer end of this plunger I secure a flexible cable 22ª which corresponds to the cable 22 and is operable in the same manner from a distant point. Under ordinary conditions, the parts are as shown in Figure 3 and it will be apparent that the fusible link 9 of Figure 3 will be automatically disrupted by heat to permit the sealing of the valve in an automatic manner and also that a tug on the cable 22ª will manually withdraw the plunger 16ª and permit the keeper to descend in order that the valve may close under the action of the spring 6. A limiting screw 30 is preferably associated with the casing and works in a slot 31 to preclude the plunger from being retracted into the pipe 23.

I have not shown any resetting means in the construction of Figure 3, and it would be necessary in the construction shown to partially dismantle the parts to reset the device, yet for simple and cheap construction, the device as shown in Figure 3 will do the work required. Said construction may however be rendered more easily reset by forming the keeper 14ª with a rack and cooperating pinion after the manner shown in Figure 1 and the plunger 16ª may be made to automatically reset itself by placing it under the action of a spring which would impel it at all times in the direction of the keeper 14ª.

The foregoing detailed description sets forth practical embodiments of the invention yet from what has been said, it will be apparent that the device may be changed in structural details without departing from the spirit of this invention which is to be understood as commensurate with the appended claims.

Having thus fully described the invention, what I claim as new and desire to secure by Letters Patent is:

1. An assembly of the character described embodying a valve comprising a valve casing, a seat therein, a sealing member provided with a stem and means for normally maintaining the sealing member to the seat, combined with an extension of the stem and a fusible link interposed between the said stem and extension, a bodily-movable retaining member cooperable with the stem extension to normally retain the latter in retracted position, and manually operable means for moving said retaining member out of engagement with said stem extension.

2. An assembly of the character described embodying a valve provided with a valve stem, a valve stem extension, a fusible link connecting said stem and extension, means tending to normally seal the valve, bodily-movable means normally holding said stem extension to maintain the valve unseated to prevent sealing of the valve automatically only through fusion of the fusible link, and manually-operable means cooperable with the valve stem extension to be moved out of operable relation thereto to permit of the sealing of the valve even though the fusible link remains intact.

3. An assembly of the character described embodying a valve comprising a valve casing, a valve seat therein, a sealing member provided with a stem and means for normally maintaining the sealing member to the seat, combined with a yoke mounted on the valve casing, a valve stem extension guided in said yoke, a fusible connection between said stem and its extension, the yoke having a lateral member, and a manually operable element in said lateral extension to hold the sealing member unseated and bodily movable out of engagement with said stem extension to release the latter and permit automatic seating of the sealing member.

4. An assembly of the character described embodying a valve comprising a valve casing, a valve seat therein, a sealing member provided with a stem and means for normally maintaining the sealing member to the seat, combined with a yoke mounted on the valve casing, a valve stem extension guided in said yoke, a fusible connection between said stem and its extension, the yoke having a lateral member, and a manually operable element in said lateral member engageable with said extension to hold the sealing member unseated and bodily movable out of engagement with said stem extension to release the latter and permit seating of the valve, and resetting means cooperable with the valve extension.

5. An assembly of the character described embodying a valve casing provided interiorly with a seat, a sealing member having a stem, and means for normally impelling the sealing member to the seat in combination with a yoke supported on the valve casing, a notched plunger mounted on the yoke for sliding movement in alinement with the stem, a fusible link connecting the plunger to the stem, a manually-operable bodily-movable retaining member adapted to normally engage with the notch of the plunger to maintain the plunger in retracted position and hold the sealing member unseated, and manually operable means for withdrawing the retaining member from the notch of the plunger to permit the seating of the sealing member.

6. An assembly of the character described embodying a valve casing provided interiorly with a seat, a sealing member having a stem, and means for normally impelling the sealing member to the seat in combination with a yoke supported on the valve casing, a notched plunger mounted on the yoke for sliding movement in alinement with the stem, a fusible link connecting the plunger to the stem, a manually-operable bodily-movable retaining member adapted to normally engage with the notch of the plunger to maintain the plunger in retracted position and hold the sealing member unseated, a conduit leading from the yoke to a distant point and a tension member operatively connected with the retaining member and passing through said conduit to said distant point whereat it is adapted to be manually placed under tension to effect the retraction of the retaining member and permit and effect the release of the plunger so that the sealing member may be seated.

7. An assembly of the character described embodying a valve, means normally tending to seal the valve, a keeper normally held in restraint, a fusible link connecting the keeper to the valve stem and adapted when fused to release the valve stem, and permit the valve to automatically seal, means operable from a distant point to release the keeper and permit the sealing of the valve even though the fusible link remain intact, a rack associated with the keeper and a manually operable pinion meshing with the rack to permit the manual reopening of the valve after it has been sealed, said rack and pinion being independent of the valve sealing means.

8. An assembly of the character described embodying a valve casing provided with a seat, a sealing member having a stem, means for normally tending to force the sealing member to its seat, a keeper, a fusible link connecting the keeper to the stem, a retaining member for normally holding the keeper in restraint to hold the sealing member off its seat, manually operable means for retracting the retaining member to release the keeper to permit the sealing member to seat, a rack associated with the keeper, a pinion meshing with the rack, said rack and pinion being independent of the means for forcing the sealing member to its seat, and manually operable means for rotating the pinion to retract the keeper and unseat the sealing member after it has been seated.

9. An assembly of the character described embodying a valve casing provided with a seat, a sealing member having a stem, means for normally tending to force the sealing member to its seat, a keeper, a fusible link connecting the keeper to the stem, a retaining member for normally holding the keeper in restraint to hold the sealing member off its seat, manually operable means for retracting the retaining member to release the keeper to permit the sealing member to seat, a rack associated with the keeper, a pinion meshing with the rack, said rack and pinion being independent of the means for forcing the sealing member to its seat, and manually operable means for rotating the pinion to retract the keeper and unseat the sealing member after it has been seated, said retaining member being adapted to automatically re-engage the keeper when said keeper is retracted by the manually operable pinion.

10. An assembly of the character described embodying a valve casing provided with a seat, a sealing member having a stem, means for normally tending to force the sealing member to its seat, a keeper, a fusible link connecting the keeper to the stem, a retaining member for normally holding the keeper in restraint to hold the sealing member off its seat, manually operable means for retracting the retainer member to release the keeper to permit the sealing member to seat, and manually operable means associated with the keeper for restoring the parts after the sealing member has been seated, said manual operable means being independent of, and acting in opposition to, the means for forcing the sealing member to its seat.

11. An assembly of the character described embodying a valve seat, a valve, means for normally impelling the valve toward the seat, a stem associated with the valve, a keeper, a fusible link normally securing the valve stem to the keeper, means for holding the keeper in restraint to maintain the valve unseated, and manual operable means for releasing the keeper and thereby permitting the seating of the valve while the keeper and valve remain secured together by the fusible link.

In testimony whereof I have signed the foregoing specification.

FREDERICK SCHMIDT.